(12) United States Patent
Jonsson et al.

(10) Patent No.: US 7,342,372 B2
(45) Date of Patent: Mar. 11, 2008

(54) METHOD FOR POWER CONTROL OF AN ELECTRIC MOTOR

(75) Inventors: Stefan Jonsson, Stockholm (SE); Jonas Beskow, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 155 days.

(21) Appl. No.: 11/243,918

(22) Filed: Oct. 5, 2005

(65) Prior Publication Data
US 2007/0075668 A1 Apr. 5, 2007

(51) Int. Cl.
*H02K 23/16* (2006.01)
(52) U.S. Cl. ............... 318/437; 318/799; 318/629; 363/39; 363/45; 323/212; 323/219
(58) Field of Classification Search ............... 318/437, 318/799, 629; 363/39, 45; 323/212, 219
See application file for complete search history.

(56) References Cited

U.S. PATENT DOCUMENTS

| 5,747,972 | A | * | 5/1998 | Baretich et al. ............. 323/223 |
| 5,796,245 | A |   | 8/1998 | Beaulieu et al. ............. 323/322 |
| 5,955,794 | A |   | 9/1999 | Schulz et al. |
| 6,141,227 | A | * | 10/2000 | Sheikh et al. ................. 363/41 |
| 6,570,361 | B1 | * | 5/2003 | Edelson ....................... 318/801 |
| 6,573,797 | B2 | * | 6/2003 | Yokota ......................... 330/302 |
| 6,614,197 | B2 | * | 9/2003 | Berringer ..................... 318/245 |

FOREIGN PATENT DOCUMENTS

| EP | 0 859 452 | 8/1998 |
| WO | WO 2004/017504 | 2/2004 |

OTHER PUBLICATIONS

Anonymous Author, Method of Reducing Harmonics in the Current of Triac Controlled Mains Fed Motors, Research Disclosure Journal, Nov. 1994, Journal No. 36710, Kenneth Mason Publications Ltd:, Westbourne, United Kingdom.

* cited by examiner

*Primary Examiner*—Rita Leykin
(74) *Attorney, Agent, or Firm*—Pearne & Gordon LLP

(57) ABSTRACT

The invention relates to a method for power control of an electric motor, in particular a motor for driving the suction fan of a vacuum cleaner connected to an AC mains power supply. The power control is effected by varying the phase angle of the electric alternating quantity supplied to the motor by the use of semiconductor switches. AC power supplied to the motor is switched by using different delay times for the switching in each half-period of a full AC period to suppress odd harmonics, particularly the third harmonic of the mains power line frequency. Half-periods of a full period are mirrored in the next consecutive full period in order to suppress even harmonics, particularly the second harmonic of the mains power line frequency. A set of delay times t1 and t2 are defined and selected to be used in further avoiding critical delay time areas for harmonics and minimize the generation of vibrations.

4 Claims, 5 Drawing Sheets

METHOD FOR POWER CONTROL OF AN ELECTRIC MOTOR

The present invention relates to a method for power control of an electric motor, in particular a motor for driving the suction fan of a vacuum cleaner connected to an AC mains power supply, said power control being effected by varying the phase angle of the electric alternating quantity supplied to the motor by the use of semiconductor switches.

A common technique today for regulating the motor power is to chop the line power sinus wave by a delay at the beginning of each half period. Unfortunately, this technique generates overtones, harmonics, to the mains supplier net. If a three-phase system would hold perfectly harmonically 50 Hz sinus waves the current levels in the three phases are displaced 120 degrees internally and the sum of the three phase currents becomes almost zero. If harmonics are generated, these include other phase angles and frequencies, and the sum of the three phase currents in the common conductor is higher compared to a system without harmonics. Hence, there is an increased load indicated and a risk that the net becomes overloaded. Due to this mains power line suppliers generally set limits regarding current levels for the different harmonics.

There are a number of patents to be found dealing with the problem of harmonics when regulating the motor speed by switching the alternating supply current. The patent document U.S. Pat. No. 5,796,245 describes a method for switching using different time delays. The patent document EP-B1-0859452 implements a very similar solution. The patent document WO 2004/017504 A1 suggests further improvements by using a further triac type semiconductor switch in order to effect a smoother switching of the AC supply and thereby to decrease the harmonic frequencies created. However, these documents operate within different full periods of the alternating current, which still, for instance, will create a considerable amount of vibrations of the unit, particularly at reduced power levels.

The object of the invention is to further avoid these drawbacks and to improve the control system of the motor to thereby obtain a decrease in vibrations of the motorized device and furthermore to decrease the level of harmonics generated by the system. The object will be achieved by the use of a method incorporating the features indicated in the appending claim 1. Preferred embodiments are included in the associated sub-claims.

Further objects and advantages will be apparent from the detailed description of an embodiment of the invention, given below as a non-limitative example, with reference to the accompanying drawings, in which.

As indicated above the common technique for regulating the motor power, i.e. the motor revolution rate, is to chop the line power sinus wave with delays at the beginning of each half period. This control is generally performed using triac type semiconductor switches in the motor control circuit.

According to the state of the art demonstrated by the documents discussed above switching is implemented only with equal delays in each half of a full period of the AC supply power. Delay changes are performed between full periods in attempts to suppress harmonics to any acceptable level.

Figures 1A, 1B:
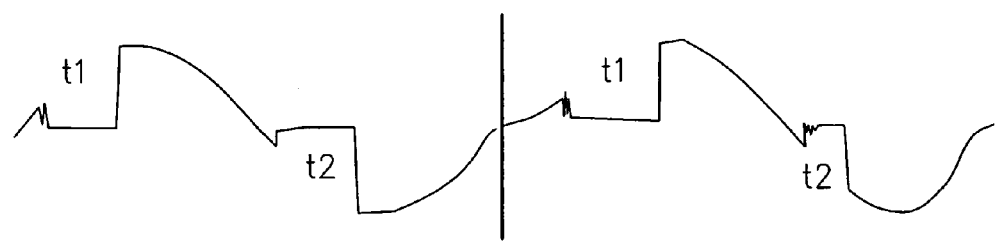
FIG. 1a illustrates a symmetric switching in each half-period, t2=t1.
FIG. 1b illustrates a switching using different half-period delays, t2=f(t1)
Figures 2A, 2B:
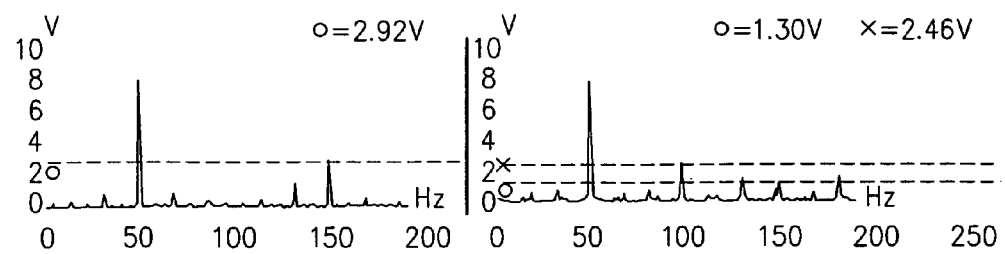
FIG. 2a illustrates the frequency spectrum of the switching according to FIG. 1a showing a strong third harmonic.
FIG. 2b illustrates the frequency spectrum of the switching according to FIG. 1b showing a strong second harmonic.

The present invention has a different approach of attacking and reducing the problem of harmonics, which is quite different from the state of the art but still very simple to apply. The present inventive idea is based on a use of different delays within the half-periods of a full period, which then will suppress all odd harmonics. FIG. 1a shows switching with equal half-period delays with t2=t1, which then produce a strong third harmonic as illustrated by FIG. 2a. A way to avoid the odd harmonics is to use a different delay in one of the half-periods over a whole period, see t1 and t2 in FIG. 1b, where t2=f(t1). Thereby the generated odd harmonics generally become internally displaced and attenuated and even damped out. This is especially the case for the critical third harmonic at 150 Hz. Unfortunately this technique generates high levels of the second harmonic, 100 Hz, as can be seen in FIG. 2b.

In the frequency spectrum in FIG. 2b the third harmonic 150 Hz is damped but an even harmonic instead is generated at 100 Hz. Thus, when the half-period delays, t1 and t2, becomes different the second harmonic is generated, however when t2=t1 the 100 Hz harmonic is zero.

Figures 3A, 3B:
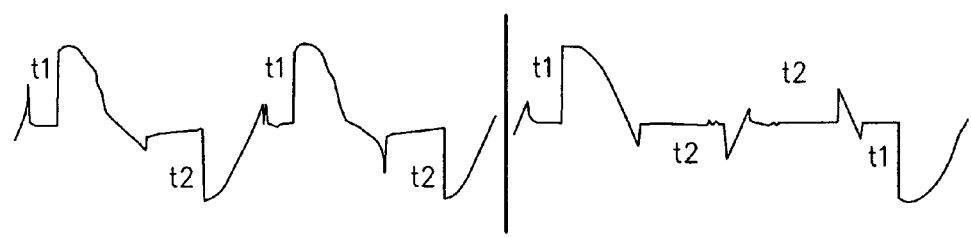
FIG. 3a illustrates the switching with equal periods but with different delays in each half-period.
FIG. 3b illustrates switching using mirrored periods in accordance with the present invention.
Figures 4A, 4B:
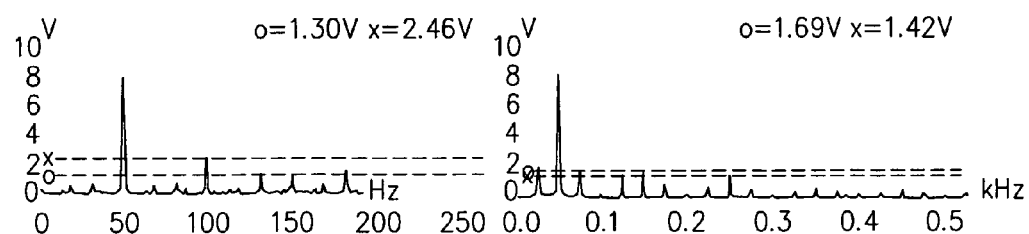
FIG. 4a illustrates the frequency spectrum from measurements when switching with equal periods and different delays in each half-period which suppresses the third harmonic but creates a second harmonic.
FIG. 4b illustrates the frequency spectrum from a sequence with mirrored periods and different delays in the half-periods.

The 100 Hz harmonic is generated when each following period is controlled with the same delays, t1 and t2, mutually different. If, instead, as illustrated by FIG. 3b, every second period is a mirror picture of the preceding one, i.a. the two half-periods appear in reversed order, the second harmonic 100 Hz is eliminated or damped. The third harmonic 150 Hz is then still kept at a low level. Compare FIG. 4a and FIG. 4b.

Figure 5:
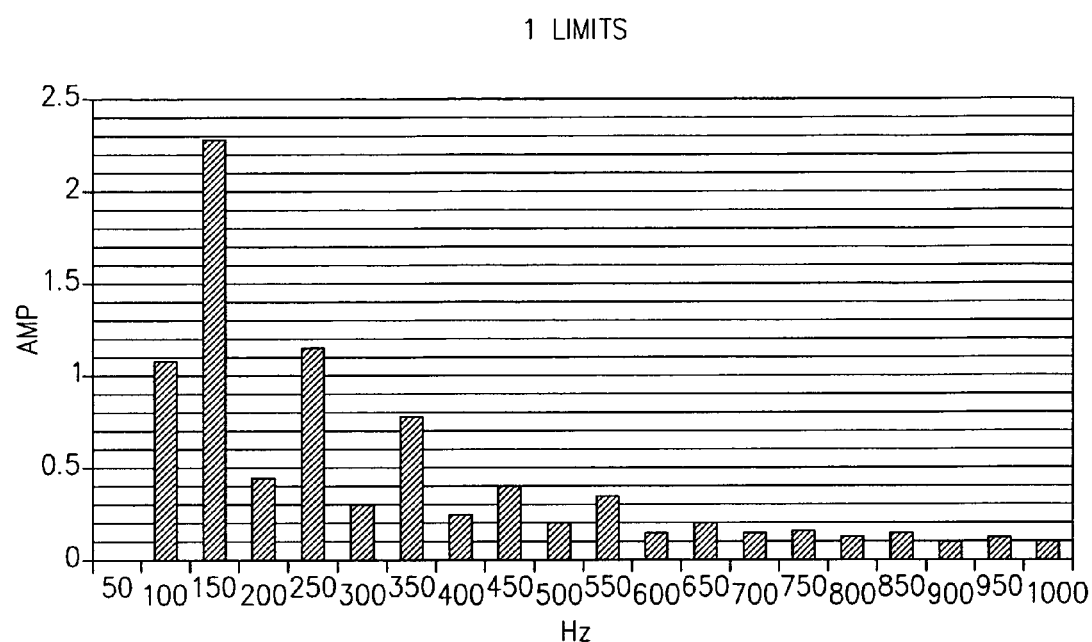
FIG. 5 shows current limits for 50 Hz harmonics.

As indicated above the mains suppliers have set limits regarding current levels for the different harmonics. In FIG. 5 these limits are presented for each harmonic of the European mains base frequency 50 Hz.

The current levels for the harmonics according to the present invention are estimated by a combination of measured levels and Fourier analysis. Power levels have been calculated with a function of the two half-period delays, t1 and t2. The square root of this function also describes the rms value of the current. By multiplying the power function with the different harmonics components in the Fourier series and finally calibrating this product with a constant against measured current levels the current levels for the harmonics could be estimated.

In estimating current levels for the third harmonic 150 Hz a maximal current of 2.25 A was achieved when t2=t1=4.27 ms. This shows a perfect agreement between theoretical estimated and measured maximal point.

Figure 6:
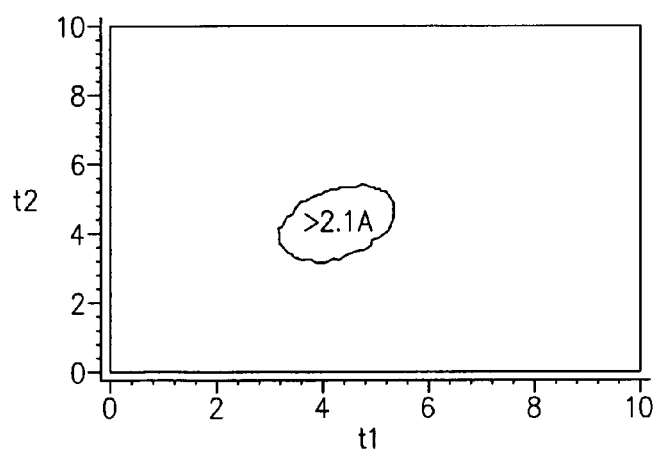
FIG. 6 shows a critical domain for the third harmonic, (>2.1 A)

Since the current limit for the 150 Hz is 2.3 A, the current level is below but too close. The method used for measuring maximal current levels for the harmonics gives a result that depends on how well sealed the canister vacuum cleaner is. Therefore a safety limit should be set below 2.3 A, approx. 2.1 A. In FIG. 6 the interior of the circle illustrates levels above 2.1 A. Thus this area should be avoided when the triggering time delays are set.

Figure 7:
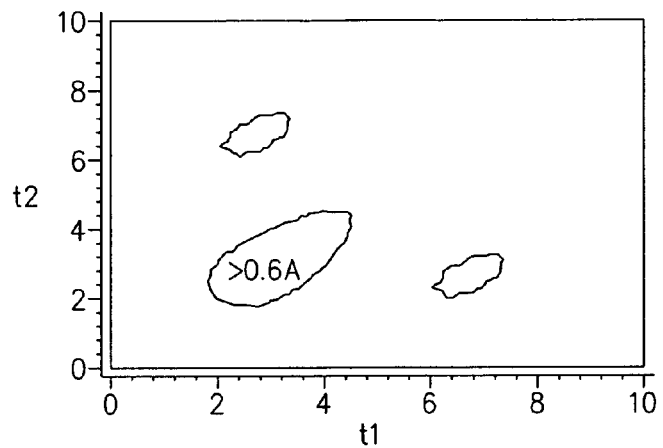
FIG. 7 shows critical domains for the fifth harmonic, (>0.6 A)

For the fifth harmonic all the calculated and measured levels are well below the permitted limit, thus it should not be a problem for the motor used. Nevertheless, since we have the possibility to compensate the triggering times it is always best to keep these levels as low as possible. In vacuum cleaners with stronger motors the fifth harmonic might cause problems. For the fifth harmonic 250 Hz a limit is set to a level of 0.6 Amp. FIG. 7 shows the peak areas were the current levels are above 0.6 Amp.

Figure 8:
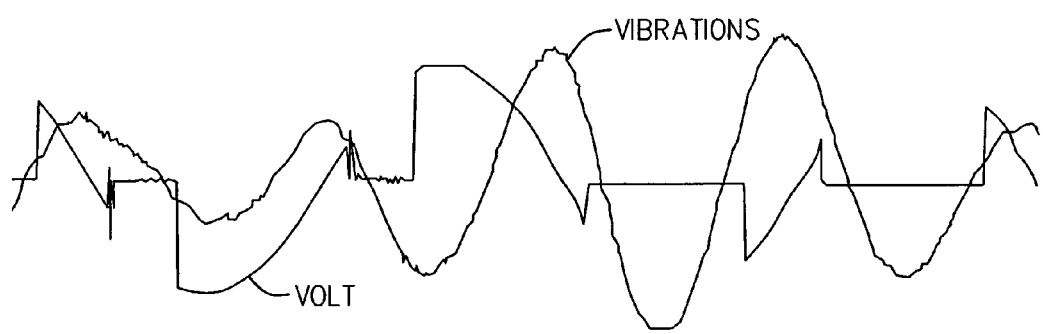
FIG. 8 illustrates vibration measurements with an accelerometer placed at the top of a canister type vacuum cleaner.

One problem with different triggering times (delays) over the periods is vibrations. The more the two triggering times, t1 and t2 differ, the more vibrations are generated. This is especially noticeable for long delays, i.e. low power settings. Due to the fact that the momentum of the motor revolutions at small triggering times, i.e. high power setting, is high and the sinus wave is closer to its normal shape, the distortions are smoothened out and thereby less vibrations are generated. In order to measure the vibrations an accelerometer was connected on the top of the canister vacuum cleaner. The signal from the accelerometer was sampled at the same time as the triggering time delays of the power control, see FIG. 8.

Figure 9:
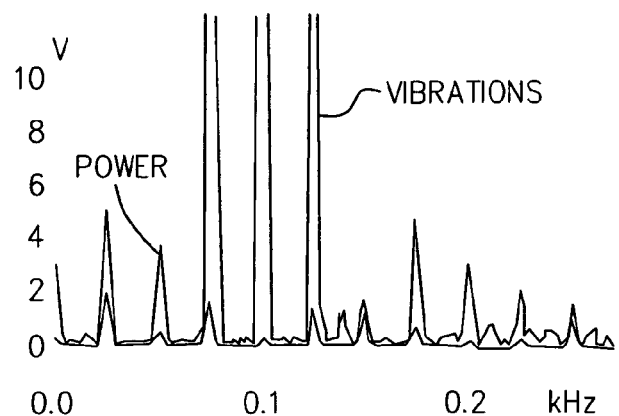
FIG. 9 illustrates a vibration frequency spectrum achieved according to the measurement of FIG. 8.

From the measured vibrations a frequency spectrum becomes available, see FIG. 9. By having control of vibration levels and triggering times, limits for triggering times could be set in order to keep vibration levels low.

A subjective conclusion was that the acoustic noise is dependent on a frequency half the mains frequency of 50 Hz. It was noted that in order to keep vibrations at a low level this frequency 25 Hz is to be kept at a low level as well. Accordingly, in setting the maximal triggering delay times the 25 Hz peak was the measure.

Figure 10:
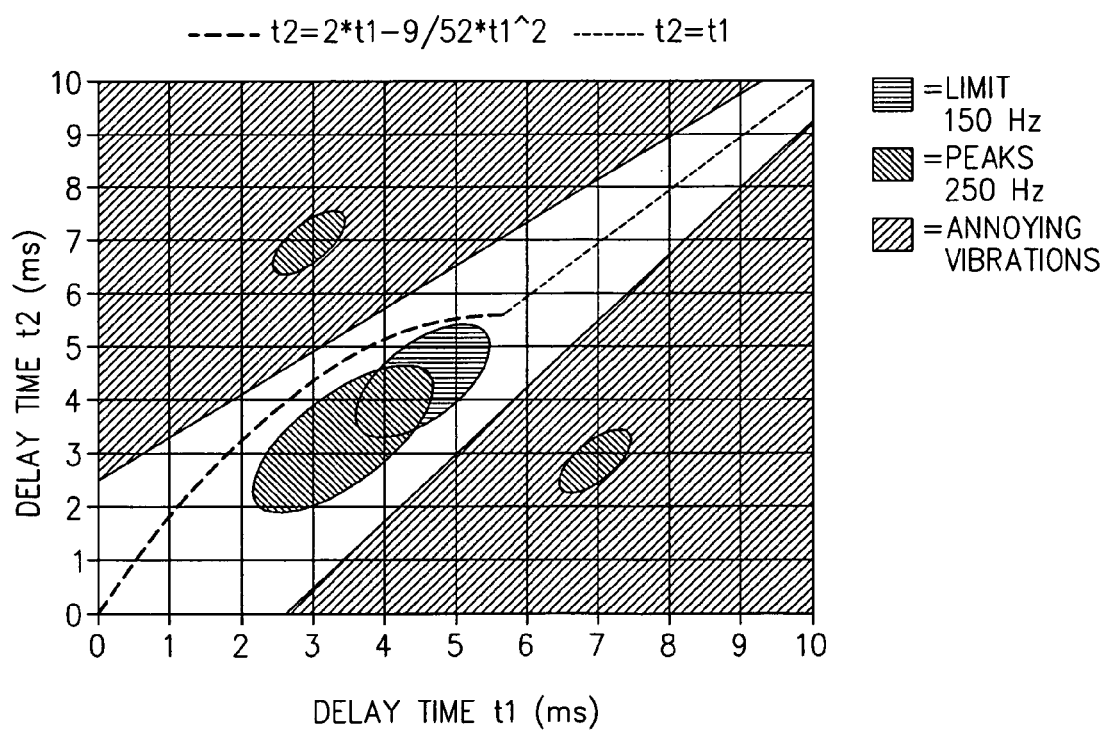
FIG. 10 illustrates a final solution in order to keep harmonics and vibrations a low levels.

From this it is possible to implement a function t2=f(t1) that avoids the critical areas for the harmonics with a lowest generation of vibrations. In FIG. 10 a diagram is shown in which delay time t2 has been plotted against delay time t1. At lower speeds t2 can be selected to be equal to t1. However, at higher speeds the elliptic areas along the diagonal extending from the lower left to upper right in the diagram should be avoided because the level of the third harmonic 150 Hz and to some extent also the level of the fifth harmonic could be too high. From this figure it can be read out that in order to achieve optimum results both as to the reduction of harmonics and vibrations, for values of the triggering delay time t1<5.69 ms:

$$t2=2*t1-9/52*(t1)^2,\text{ whereas for values of }t1>5.69\text{ ms:}$$

$$t2=t1.$$

In more general terms, for t1<(t1=t2=f(t1)):

$$t2=a*t1+b*(t1)^2,$$

whereas for $t1>(t1=t2=f(t1))$:

$$t2=t1$$

The latter formula set can easily be adapted to different applications of electric motors in vacuum cleaners by properly selecting the constants a and b for the purpose of minimizing the levels of harmonics and reducing vibrations.

Generally, control systems of today are built around small microprocessors, which will handle all sorts of controls of the device. The different delays used according to the present invention are simply controlled by a microprocessor. A standard Motorola microprocessor with a built-in memory housing the control program can be used. In the illustrative embodiment a Motorola MC68HC908QY4 was used. The motor speed can be manually set by operating a power setting control member. It can also be automatically controlled for instance by a pressure sensor sensing the vacuum at a suitable place in the vacuum cleaner. By this the power of the vacuum cleaner can be set to automatically adapt to the continuous clogging of the dust bag during the course of time.

The invention claimed is:

1. A method for power control of an electric motor for driving the suction fan of a vacuum cleaner connected to an AC mains power supply, said power control being effected by varying the phase angle of the electric alternating quantity supplied to the motor by the use of semiconductor switches, the method comprising the steps of
    switching AC power supply to the motor by using different delay times for the switching in each half-period of a full AC period to suppress odd harmonics, including the third harmonic of the mains power line frequency;
    mirroring half-periods of a full period in the next consecutive full period in order to suppress even harmonics, including the second harmonic of the mains power line frequency.

2. Method according to claim 1, further comprising the step of
    defining and selecting a set of delay times t1 and t2.

3. Method according to claim 2, further comprising the step of
    selecting t2=f(t1)=a*t1+b*(t1)² for t1<(t1=t2=f(t1)), and for selecting t2=t1 for t1>(t1=t2=f(t1)),
    wherein a and b are constants.

4. Method according to claim 2, further comprising the step of
    selecting t2=2*t1−9/52*(t1)² for t1<5.69 ms, and for selecting t2=t1 for t1>5.69 ms.

* * * * *